United States Patent
Pfau et al.

(10) Patent No.: US 11,673,668 B2
(45) Date of Patent: Jun. 13, 2023

(54) POWERED RAIL MOUNTED AIR CARGO CART

(71) Applicant: GOODRICH CORPORATION, Charlotte, NC (US)

(72) Inventors: Ryan Pfau, Jamestown, ND (US); Wallace Harold Larson, Jamestown, ND (US)

(73) Assignee: Goodrich Corporation, Charlotte, NC (US)

(*) Notice: Subject to any disclaimer, the term of this patent is extended or adjusted under 35 U.S.C. 154(b) by 759 days.

(21) Appl. No.: 16/577,715

(22) Filed: Sep. 20, 2019

(65) Prior Publication Data

US 2021/0086899 A1  Mar. 25, 2021

(51) Int. Cl.
*B64D 9/00* (2006.01)
*B65G 67/00* (2006.01)
*B61B 13/00* (2006.01)

(52) U.S. Cl.
CPC .............. *B64D 9/00* (2013.01); *B61B 13/00* (2013.01); *B65G 67/00* (2013.01); *B64D 2009/006* (2013.01)

(58) Field of Classification Search
CPC ....... B64C 1/20; B64C 1/22; B64D 2009/006; B64D 9/00; B64D 9/003
See application file for complete search history.

(56) References Cited

U.S. PATENT DOCUMENTS

| | | | | |
|---|---|---|---|---|
| 4,984,756 A | * | 1/1991 | Anders | B60P 1/365 244/137.1 |
| 5,131,606 A | * | 7/1992 | Nordstrom | B64D 9/003 244/137.1 |
| 5,785,277 A | * | 7/1998 | Manning | B64D 9/00 244/118.6 |
| 7,785,056 B2 | | 8/2010 | Sanford et al. | |
| 8,286,913 B2 | * | 10/2012 | Barauke | B64C 1/20 244/118.6 |
| 8,333,157 B2 | * | 12/2012 | Kissel | B61B 13/00 105/72.2 |
| 9,555,720 B2 | * | 1/2017 | Aumann | B60L 13/03 |
| 9,764,840 B2 | | 9/2017 | Himmelmann | |
| 9,776,720 B2 | | 10/2017 | Himmelmann | |
| 9,789,965 B2 | * | 10/2017 | Benthien | B64D 11/0696 |
| 10,196,146 B2 | | 2/2019 | Himmelmann | |
| 10,781,854 B2 | * | 9/2020 | Neufeld | B65G 54/02 |
| 2018/0056848 A1 | * | 3/2018 | Koehler | B60P 7/13 |

\* cited by examiner

*Primary Examiner* — Richard Green
*Assistant Examiner* — Madison Elizabeth Dittner
(74) *Attorney, Agent, or Firm* — Snell & Wilmer L.L.P.

(57) ABSTRACT

A cargo handling system is disclosed. In various embodiments, the cargo handling system includes a first rail defining an upward facing surface and a longitudinal direction and a lateral direction; a platform having a first recessed channel configured to engage an upper portion of the first rail to prevent a movement of the platform in the lateral direction and configured for rolling engagement with the first rail; and a first drive assembly disposed within the platform and configured to propel the platform along the first rail in the longitudinal direction, the first drive assembly having a first drive roller and a first motor.

14 Claims, 9 Drawing Sheets

POWERED RAIL MOUNTED AIR CARGO CART

FIELD

The present disclosure relates generally to cargo handling systems and, more particularly, to systems used to load and transport cargo in cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include roller trays containing transport rollers that support and transport the containerized cargo or pallets. Stationary, motor driven rollers are typically employed in these systems. In certain aircraft, a plurality of motor driven power drive units (PDUs), each of which is also stationary, is used to propel the containers or pallets within the cargo compartment. This configuration facilitates transportation of the containers or pallets within the cargo compartment by one or more operators or agent-based systems controlling operation of the PDUs. However, such configurations typically include a complex structure of permanently installed hardware requiring power and control cables running throughout the cargo compartment and to each of the PDUs and other components of the configurations. The configurations also typically are not amendable to loading long cargo runs (e.g., a beam or tower extending a substantial length of the cargo compartment) having multiple support bases where all the support bases are associated with near simultaneous loading in order to limit the placement of undesired stresses on the cargo or the cargo handling system.

SUMMARY

A cargo handling system is disclosed. In various embodiments, the cargo handling system includes a first rail defining an upward facing surface and a longitudinal direction and a lateral direction; a platform having a first recessed channel configured to engage an upper portion of the first rail to prevent a movement of the platform in the lateral direction and configured for rolling engagement with the first rail; and a first drive assembly disposed within the platform and configured to propel the platform along the first rail in the longitudinal direction, the first drive assembly having a first drive roller and a first motor.

In various embodiments, the first drive roller is configured to ride above the upward facing surface of the first rail. In various embodiments, the first motor is configured to rotate the first drive roller.

In various embodiments, the first recessed channel includes a first lateral side configured for sliding engagement with the upper portion of the first rail. In various embodiments, the first recessed channel includes a second lateral side configured for sliding engagement with the upper portion of the first rail. In various embodiments, a first clamp is disposed on an underside of the platform and configured to extend in a first lateral direction beneath a first side of the upper portion of the first rail. In various embodiments, a second clamp is disposed on the underside of the platform and configured to extend in a second lateral direction beneath a second side of the upper portion of the first rail.

In various embodiments, the first motor is configured to receive power from a storage device positioned on or within the platform. In various embodiments, the first motor is configured to receive power from the first rail.

In various embodiments, a second rail is spaced a lateral distance from the first rail and the platform includes a second recessed channel configured to engage the second rail to prevent the movement of the platform in the lateral direction. In various embodiments, a second drive assembly is disposed within the platform and configured to propel the platform along the second rail in the longitudinal direction.

A method for loading cargo using a cargo handling system is disclosed. In various embodiments, the method includes positioning a cargo load on a platform disposed in rolling engagement with a first rail and a second rail; and activating a first drive assembly housed within the platform and engaged with the first rail to propel the platform along the first rail and the second rail in a longitudinal direction, the first drive assembly including a motor and a drive roller.

In various embodiments, the method includes activating a second drive assembly housed within the platform and engaged with the second rail to propel the platform along the first rail and the second rail in the longitudinal direction. In various embodiments, the first rail defines a T-shaped cross-sectional geometry and wherein the drive roller is configured to rest upon and frictionally engage an upward facing surface of the first rail. In various embodiments, a clamp is disposed on an underside of the platform and configured to extend in a lateral direction beneath an upper portion of the first rail.

A system for loading or unloading cargo on a cargo deck is disclosed. In various embodiments, the system includes a first rail and a second rail, each defining an upward facing surface and a longitudinal direction and a lateral direction; a platform configured for rolling engagement with the first rail and the second rail; a first drive assembly housed within the platform, the first drive assembly including a first motor and a first drive roller configured to propel the platform in the longitudinal direction; and a second drive assembly housed within the platform, the second drive assembly including a second motor and a second drive roller configured to propel the platform in the longitudinal direction.

In various embodiments, the first drive roller is configured to ride above the upward facing surface of the first rail and the second drive roller is configured to ride above the upward facing surface of the second rail. In various embodiments, a clamp is disposed on an underside of the platform and configured to extend in the lateral direction beneath an upper portion of the first rail or the second rail. In various embodiments, the first motor and the second motor are configured to receive power from a storage device positioned on or within the platform.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
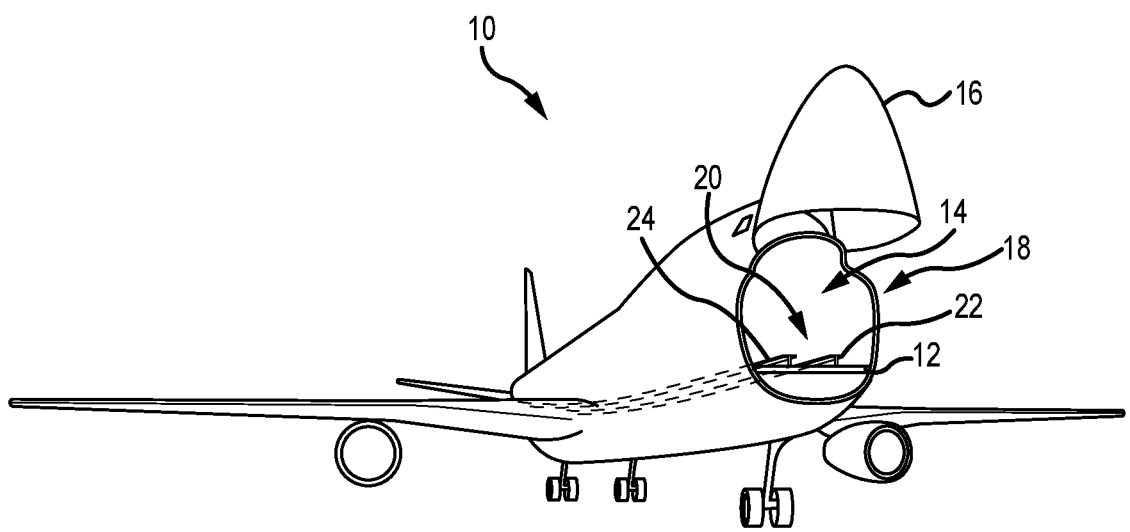
FIGS. 1A and 1B illustrate schematic views of a cargo handling system, in accordance with various embodiments.
Figure 1B:
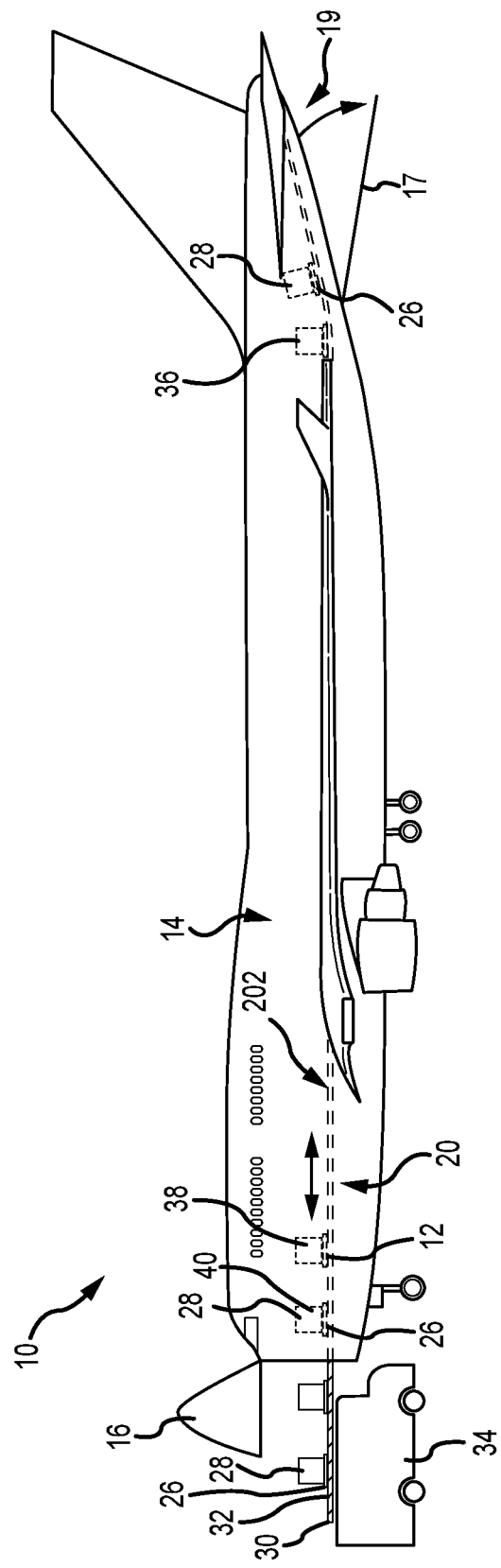

With reference to FIGS. 1A and 1B, a schematic view of an aircraft 10 having a cargo deck 12 located within a cargo compartment 14 is illustrated, in accordance with various embodiments. The aircraft 10 may comprise a cargo load door 16 located, for example, at a forward end of the aircraft 10 and configured to rotate upward (as illustrated in FIG. 1A) or sideways to expose an opening 18 that provides access to the cargo compartment 14. In various embodiments, a second cargo load door 17 may be located at other portions of the aircraft 10, such as, for example, at an aft end of the aircraft 10 and configured to rotate downward (as illustrated in FIG. 1B) and provide a second opening 19 to gain access to the cargo compartment 14. Inside the cargo compartment 14, one or more rails 20, e.g., a first rail 22 and a second rail 24, extend generally from the fore end of the aircraft 10 to the aft end of the aircraft 10. As described more fully below, the one or more rails 20 provide a support structure for which a platform 26 may transit along a length of the aircraft 10 between the fore end and the aft end and carry a ULD or some other form of cargo carrier, such as, for example, a container of a size typically used for ocean-going transport by ship or truck. Without loss of generality, a cargo load 28 of any size or shape, which may include objects within containers or ULDs or objects not within containers or ULDs, such as, for example, automobiles or the like, will be considered herein as configured for transport on the platform 26.

Still referring to FIGS. 1A and 1B, in various embodiments, the one or more rails 20, during loading or unloading of the cargo load 28, may be connected to a loading structure 30 which, in various embodiments, may comprise one or more rails 32 that correspond to the one or more rails 20 extending along the cargo deck 12 of the aircraft 10. In various embodiments, the loading structure 30 may be attached to an elevated structure, such as, for example, a truck 34 (as illustrated in FIG. 1B) or a scissor lift or a loading dock or the like, such that the one or more rails 20 and the loading structure 30 are located substantially at the same elevation and configured to transition a platform 26 either onto or off from the one or more rails 20. For example, a first cargo load 36 may be transitioned from the loading structure 30, through the opening 18 and onto the one or more rails 20, and then along the one or more rails 20 to the aft end of the aircraft, where the first cargo load is secured for transport. This may be followed by a second cargo load 38, a third cargo load 40 and so on until the cargo deck 12 is filled to a desired capacity with cargo. After the aircraft 10 has reached its destination, each cargo load, such as, for example, the first cargo load 36, the second cargo load 38 and the third cargo load 40 are unloaded from the aircraft 10 in similar fashion, but in a reverse sequence to the loading procedure. To facilitate movement of the cargo loads along the cargo deck 12, the aircraft 10 may include a cargo handling system as described herein and in accordance with various embodiments.

Figure 2:
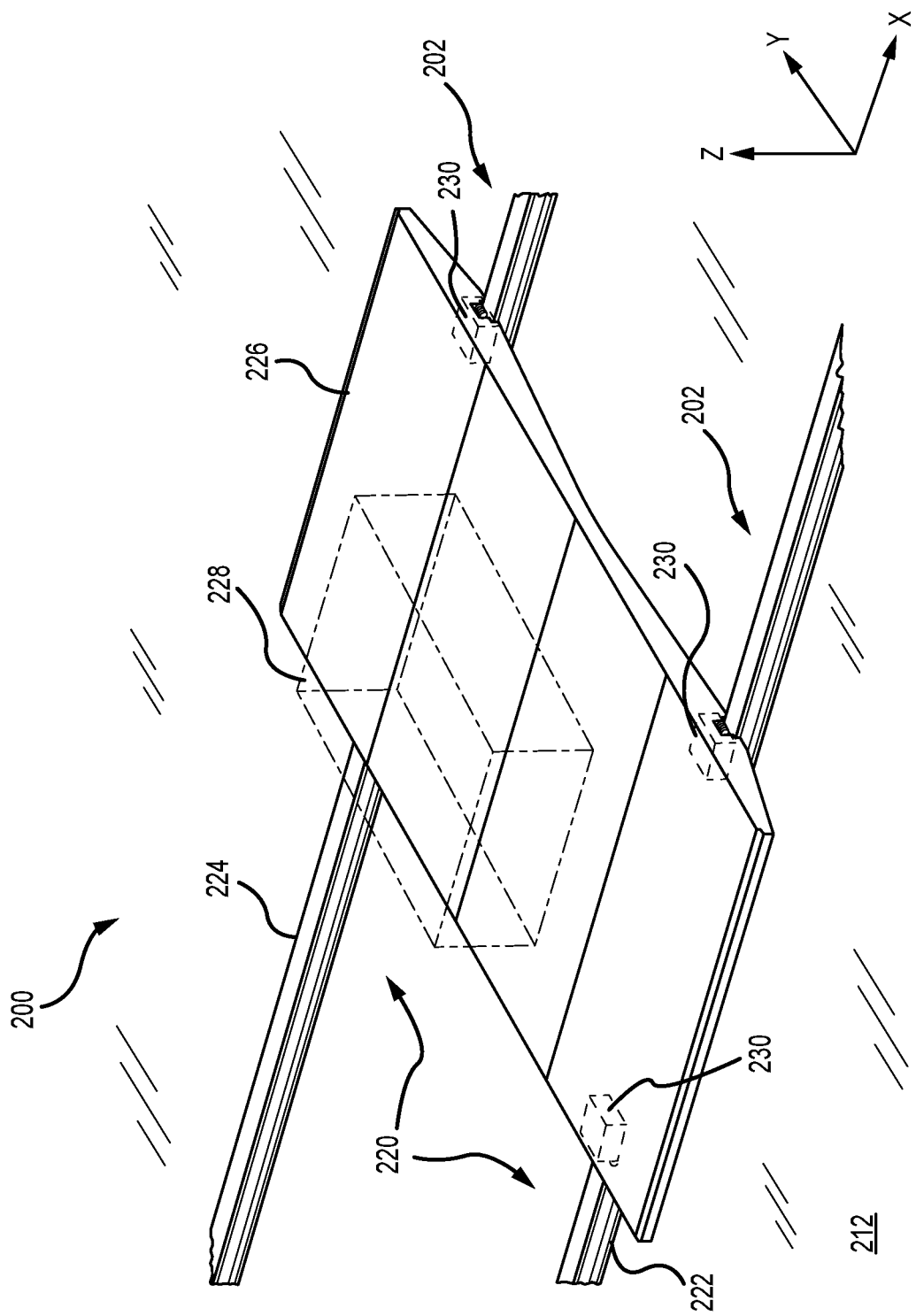
FIG. 2 illustrates a schematic view of a portion of a cargo handling system, in accordance with various embodiments.

Referring now to FIG. 2, a portion of a cargo handling system 200 is illustrated, in accordance with various embodiments. The cargo handling system 200 is illustrated with reference to an XYZ coordinate system, with the X-direction extending longitudinally in an aft direction (and defining a longitudinal direction), the Y-direction extending perpendicular to the X-direction (and defining a lateral direction) and the Z-direction extending vertically, each direction being with respect to an aircraft in which the cargo handling system 200 is positioned, such as, for example, the aircraft 10 described above with reference to FIGS. 1A and 1B. In various embodiments, the cargo handling system 200 may define a conveyance surface 202 having one or more rails 220, such as, for example, a first rail 222 and a second rail 224 spaced a lateral distance from the first rail 222, supported by a cargo deck 212, such as, for example, the cargo deck 12 described above with reference to FIGS. 1A and 1B. In various embodiments, the conveyance surface 202 may be defined by a plane that lies on the upper surface of the first rail 222 and the second rail 224. In various embodiments, the cargo handling system 200 includes a platform 226 (or a plurality of platforms), such as, for example, the platform 26 described above with reference to FIGS. 1A and 1B. The platform 226 is configured to support a cargo load 228, which may include containerized or non-containerized cargo. As illustrated in FIG. 1B, in various embodiments, the conveyance surface 202 may include a substantially level surface throughout the length of the aircraft, though a portion of the conveyance surface 202 may be curved upward, particularly toward the aft end of the aircraft where the fuselage tends to curve upward at its base in order to facilitate takeoff and landing. As described in more detail below, the platform 226 is configured to be pushed or pulled along the conveyance surface 202 via a drive assembly 230 (or a plurality of drive assemblies).

Referring now to FIGS. 3A, 3B, 3C, 3D, 3E and 3F, a powered cart 350 is illustrated, in accordance with various embodiments. The powered cart 350 includes a platform 326 and a drive assembly 330 (or a plurality of drive assemblies), such as, for example, the platform 226 and the drive assembly 230 described above with reference to FIG. 2. In various embodiments, for example, the powered cart 350 includes a first drive assembly 331, a second drive assembly 332, a third drive assembly 333 and a fourth drive assembly 334. Each such drive assembly generally includes a drive roller 336, configured to frictionally engage a rail 321 (see, e.g., FIGS. 3E and 3F), such as, for example, one of the first rail 222 and the second rail 224 described above with reference to FIG. 2, and a motor 338, configured to rotate the drive roller 336 in either a clockwise or a counterclockwise direction, so as to propel the powered cart 350 in either the forward or the aft direction along the rail 321. In various embodiments, the powered cart 350 further includes a support assembly 360 (or a plurality of support assemblies) configured to support the platform 326 on the rail 321 as the drive assembly 330 propels the platform 326 along the rail 321. In various embodiments, for example, the powered cart 350 includes a first support assembly 361, a second support assembly 362 and a third support assembly 363. Each such support assembly generally includes a passive roller 364 (or a plurality of passive rollers), supported either by the platform 326 or by a frame 366 connected to the platform 326, configured to rotate in either a clockwise or a counterclockwise direction in response to the powered cart 350 moving in either the forward or the aft direction along the rail 321.

Figure 3A:
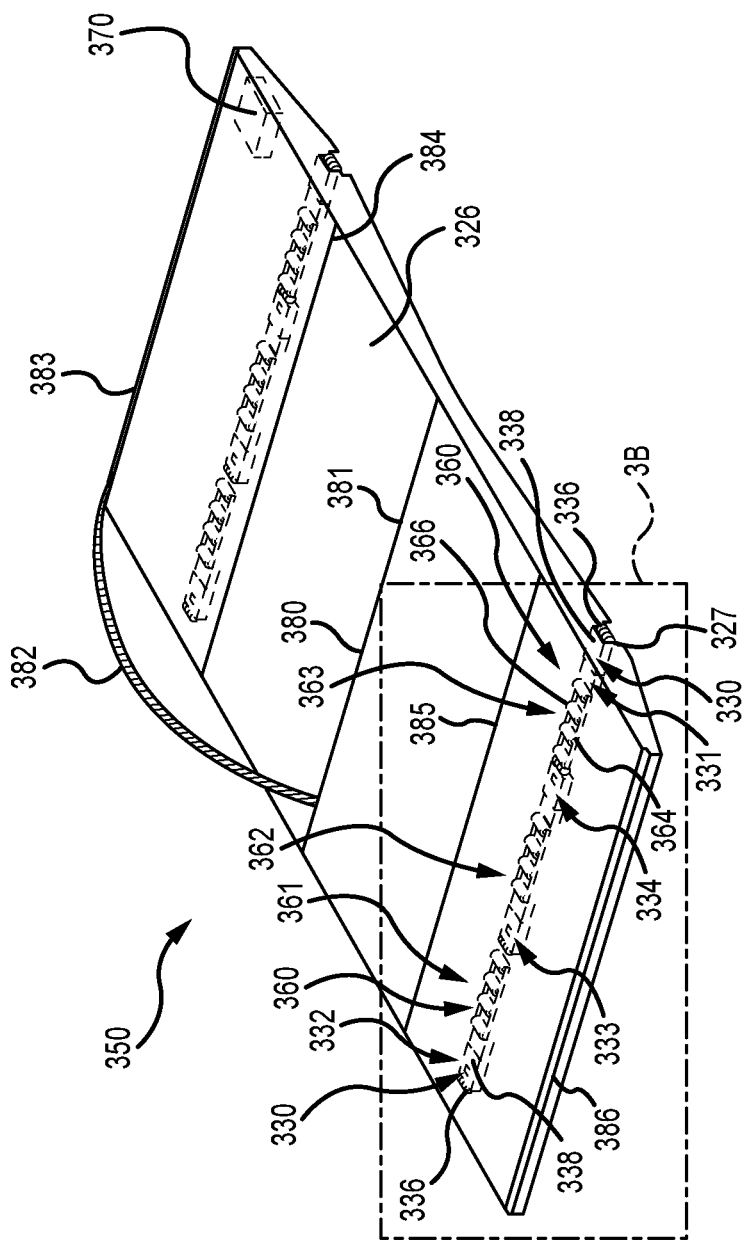
FIGS. 3A, 3B, 3C, 3D, 3E and 3F illustrate schematic views of a powered cart for a cargo handling system, in accordance with various embodiments.
Figure 3B:
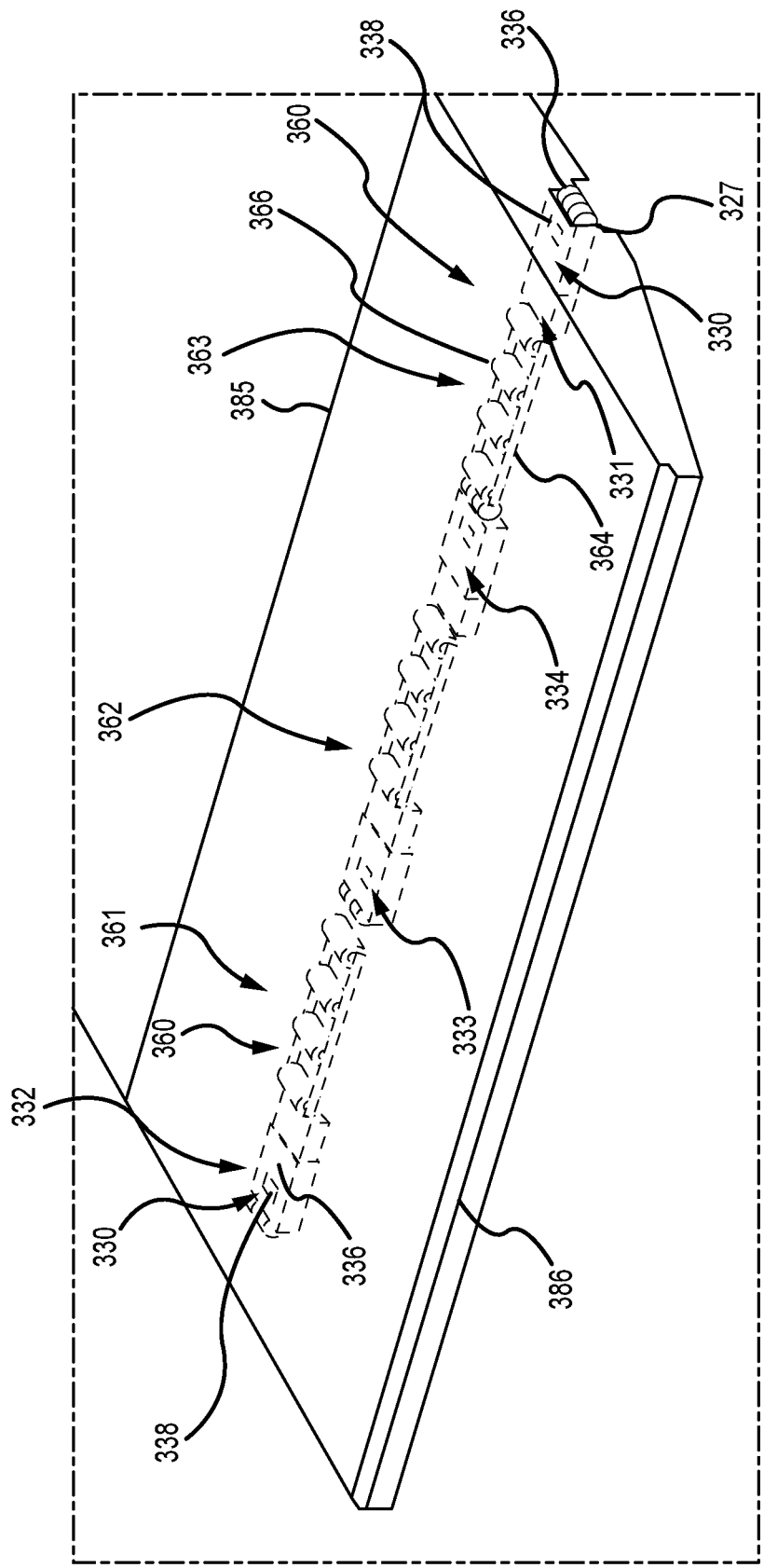
Figure 3C:
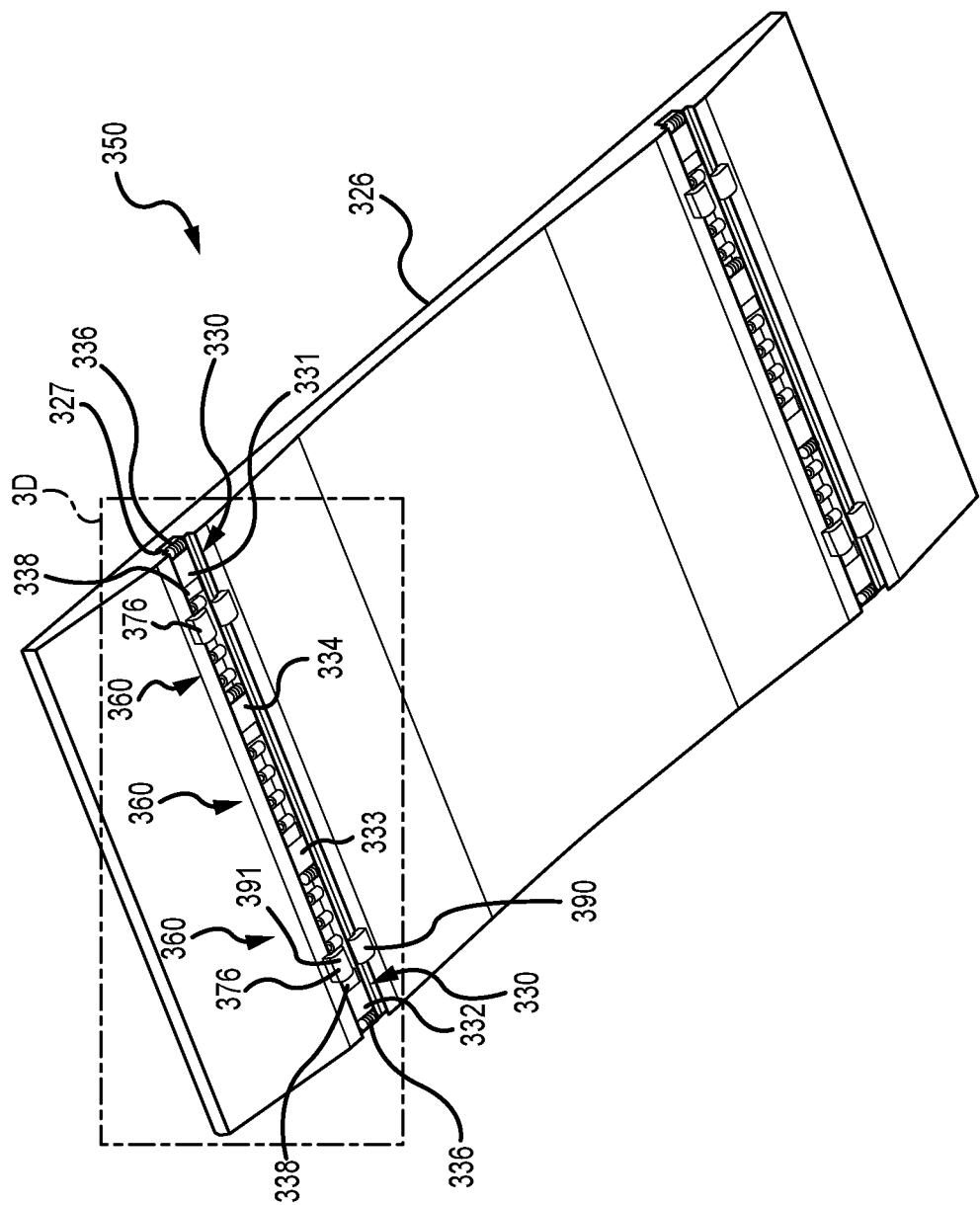
Figure 3D:
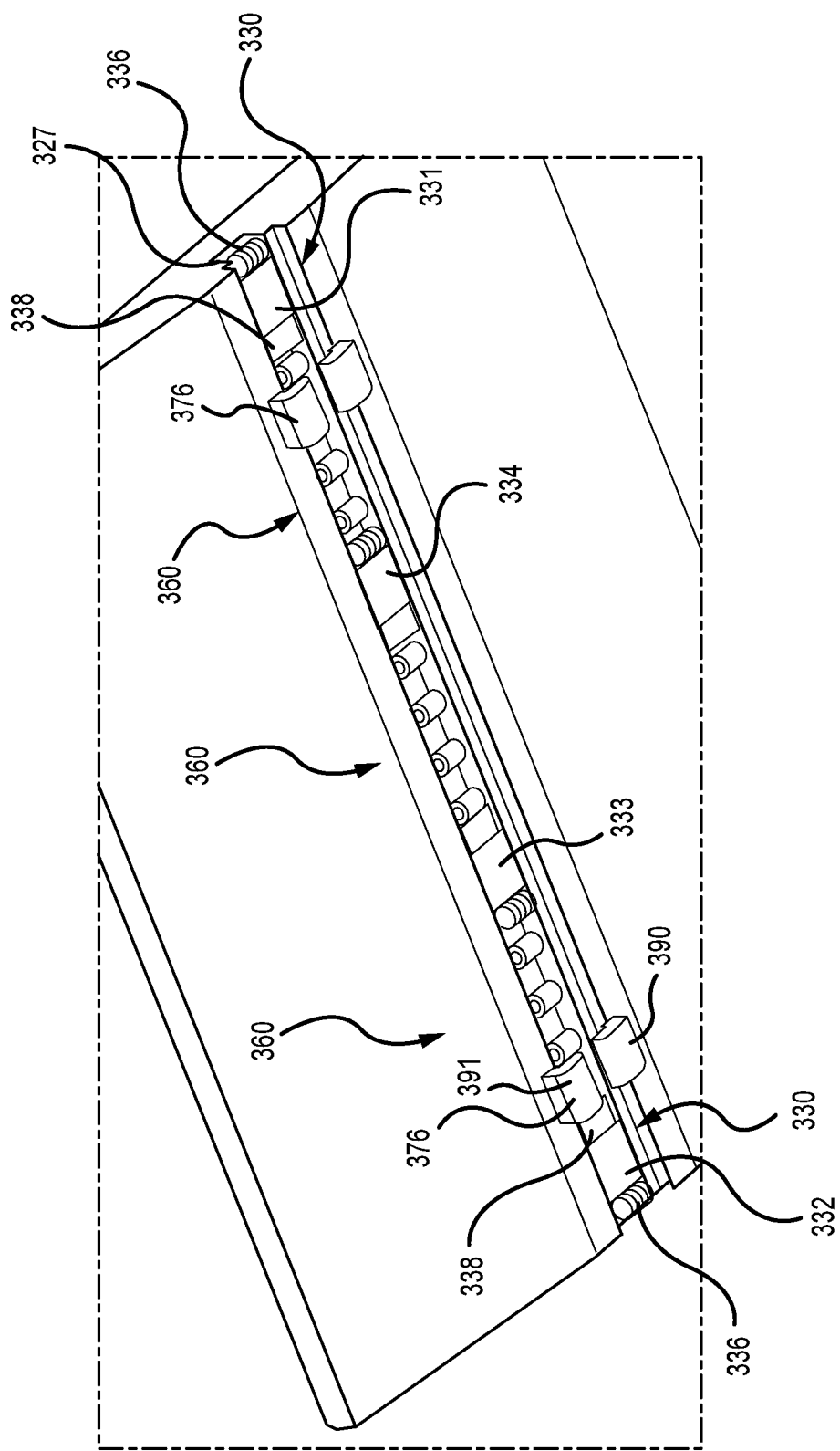
Figure 3F:
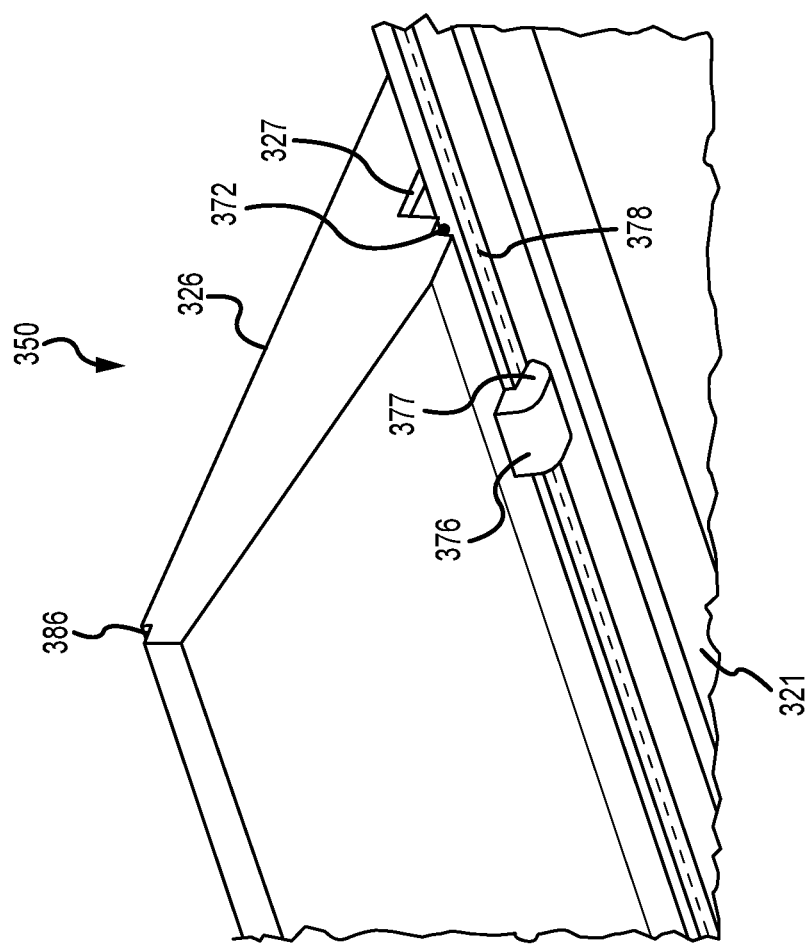
Figure 3E:
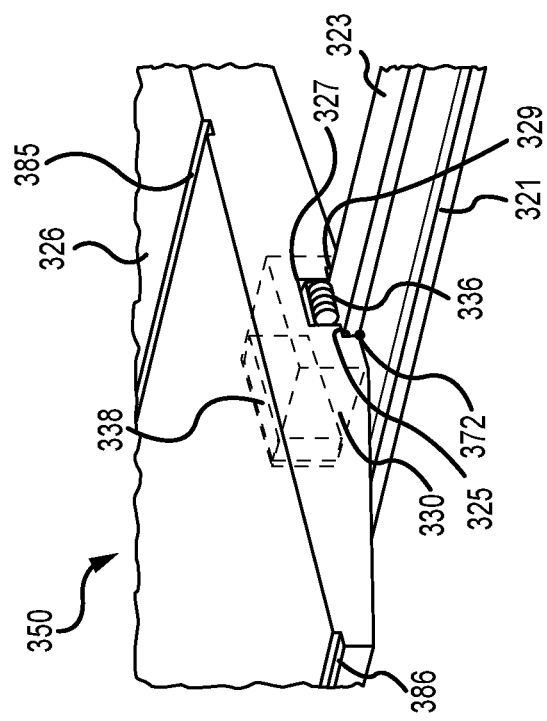

In various embodiments, the drive assembly 330 (or the plurality of drive assemblies) and the support assembly 360 (or the plurality of roller assemblies) are disposed within a recessed channel 327 that runs longitudinally along the platform 326. The recessed channel 327 may, in various embodiments, be shaped to ride on top of a T-shaped rail (e.g., an upper portion 323 of the rail 321 that has the form of a T in cross section) such that the platform 326, via the recessed channel 327, is prevented from moving side to side, laterally, with respect to the rail 321. For example, as illustrated in FIG. 3C, the recessed channel 327 may, in various embodiments, include a first lateral side 325 configured for sliding engagement with the upper portion 323 of the rail 321 and a second lateral side 329 configured for sliding engagement with the upper portion 323 of the rail 321.

In addition, a clamp 376 (or a plurality of clamps) may be disposed on the underside of the platform 326 and configured to prevent the platform 326 from rising above the rail 321 during flight. For example, in various embodiments, the clamp 376 may include a hook portion that extends under the upper portion of the rail 321 that has the form of a "T" in cross section, thereby providing a restraint against vertical movement of the platform 326 with respect to the rail 321. In addition, a first clamp 390 may extend in a first lateral direction on a first side of and beneath an upper portion of the rail 321 while a second clamp 391 may extend in a second lateral direction on a second side of and beneath the upper portion of the rail 321. For example, where the rail 321 defines a T-shaped cross-sectional geometry, the upper portion of the rail is the cross of the T and the clamps extend from the left and right sides and beneath the cross of the T. In various embodiments, one or both of the first clamp 390 and the second clamp 391 may fit into recesses disposed beneath the upper portion of the rail 321 (e.g., one or more grooves 378 running longitudinally along the rail 321) to provide additional restraint against lateral movement of the platform 326 with respect to the rail 321. Further, in various embodiments, the platform 326 may include a cargo load restraint interface 380 (or a plurality of cargo load restraint interfaces) configured to interface with equipment used to secure a cargo load (such as, for example, the cargo load 228 described above with reference to FIG. 2) to the platform 326. In various embodiments, for example, the restraint interface may comprise a first channel 381 configured to interface with a tiedown 382 and a second channel 383 configured to interface with the tie down 382. In similar fashion, a third channel 384, a fourth channel 385 and a fifth channel 386 may be used to interface with one or more tiedowns or other restraint devices to secure a cargo load to the platform 326.

Still referring to FIGS. 3A-3F, the drive assembly 330 is typically powered by a source of electrical power which, in various embodiments, may comprise a storage device 370 (e.g., a direct current battery) positioned on top of the platform 326 or within a recess cut into the platform 326. The storage device 370 may then be electrically coupled to the motor 338 via a cable or other suitable conductor for electrical power. In various embodiments, the rail 321 may be electrified to provide power to the powered cart 350. In such embodiments, the powered cart 350 may include a contact 372 positioned on the platform 326 and configured to ride against and make contact with the rail 321. A suitable ground contact may be located elsewhere (e.g., adjacent a ground rail or a ground portion of the rail 321 that is electrically shielded from the rest of the rail 321) and configured to complete an electrical circuit to the motor 338.

Figure 4:
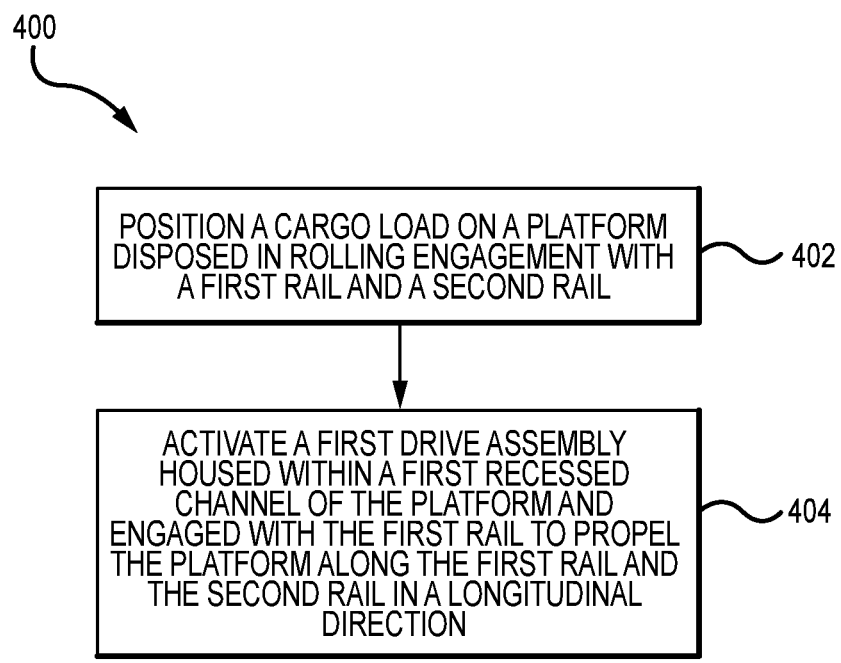
FIG. 4 describes a method of loading or unloading cargo with a cargo handling system, in accordance with various embodiments.

Referring now to FIG. 4, a method 400 for loading cargo using a cargo handling system is disclosed. In a first step 402, a cargo load is positioned on a platform disposed in rolling engagement with a first rail and a second rail. In a second step 404, a first drive assembly housed within a first recessed channel of the platform and engaged with the first rail is activated to propel the platform along the first rail and the second rail in a longitudinal direction, the first drive assembly including a first motor and a first drive roller. In various embodiments, the method 400 further includes activating a second drive assembly housed within a second recessed channel of the platform and engaged with the second rail to propel the platform along the first rail and the second rail in the longitudinal direction, the second drive assembly including a second motor and a second drive roller. In various embodiments, the first rail defines a T-shaped cross-sectional geometry and wherein the drive roller is configured to rest upon and frictionally engage an upward facing surface of the first rail. In various embodiments, a clamp is disposed on an underside of the platform and configured to extend in a lateral direction beneath an upper portion of the first rail.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:
    a first rail defining an upward facing surface and a longitudinal direction and a lateral direction;
    a platform having a first recessed channel configured to engage an upper portion of the first rail to prevent a movement of the platform in the lateral direction and configured for rolling engagement with the first rail; and
    a plurality of drive assemblies disposed within the platform and configured to propel the platform along the first rail in the longitudinal direction, the plurality of drive assemblies each having:
        a drive roller configured to rest upon and frictionally engage with the upward facing surface of the first rail; and
        a motor configured to rotate the drive roller; and
    a plurality of support assemblies, separate from the plurality of drive assemblies, disposed within the platform and configured to support the platform along the first rail in the longitudinal direction, the plurality of support assemblies each having:
    a plurality of passive rollers configured to:
        rest upon and frictionally engage the upward facing surface of the first rail; and
        rotate in response to each motor in the plurality of drive assemblies rotating a respective drive roller.

2. The cargo handling system of claim 1, wherein the first recessed channel includes a first lateral side configured for sliding engagement with the upper portion of the first rail.

3. The cargo handling system of claim 2, wherein the first recessed channel includes a second lateral side configured for sliding engagement with the upper portion of the first rail.

4. The cargo handling system of claim 3, further comprising a first clamp disposed on an underside of the platform and configured to extend in a first lateral direction beneath a first side of the upper portion of the first rail.

5. The cargo handling system of claim 4, further comprising a second clamp disposed on the underside of the platform and configured to extend in a second lateral direction beneath a second side of the upper portion of the first rail.

6. The cargo handling system of claim 1, wherein the first motor is configured to receive power from a storage device positioned on or within the platform.

7. The cargo handling system of claim 1, wherein the first motor is configured to receive power from the first rail.

8. The cargo handling system of claim 1, wherein a second rail is spaced a lateral distance from the first rail and the platform includes a second recessed channel configured to engage the second rail to prevent the movement of the platform in the lateral direction.

9. A method for loading cargo using a cargo handling system, comprising:
    positioning a cargo load on a platform disposed in rolling engagement with a first rail and a second rail; and
    activating a plurality of drive assemblies housed within the platform and engaged with the first rail to propel the platform along the first rail and the second rail in a longitudinal direction, the plurality of drive assemblies each including:
        a drive roller configured to rest upon and frictionally engage the upward facing surface of the first rail; and
        a motor configured to rotate the drive roller; and positioning a plurality of support assemblies, separate from the plurality of drive assemblies, disposed within the platform and engaged with the first rail to support the platform along the first rail in the longitudinal direction, the plurality of support assemblies each including:
a plurality of passive rollers configured to:
rest upon and frictionally engage the upward facing surface of the first rail; and
rotate in response to each motor in the plurality of drive assemblies rotating a respective drive roller.

10. The method of claim 9, wherein the first rail defines a T-shaped cross-sectional geometry.

11. The method of claim 10, wherein a clamp is disposed on an underside of the platform and configured to extend in a lateral direction beneath an upper portion of the first rail.

12. A system for loading or unloading cargo on a cargo deck, comprising:
a first rail and a second rail, each defining an upward facing surface and a longitudinal direction and a lateral direction;
a platform configured for rolling engagement with the first rail and the second rail;
a plurality of first drive assemblies housed within the platform, the plurality of first drive assemblies each including:
a first drive roller configured to rest upon and frictionally engage the upward facing surface of the first rail; and
a first motor configured to rotate the first drive roller to propel the platform in the longitudinal direction;
a plurality of first support assemblies, separate from the plurality of first drive assemblies, disposed within the platform and configured to support the platform along the first rail in the longitudinal direction, the plurality of first support assemblies each having:
a plurality of first passive rollers configured to:
rest upon and frictionally engage the upward facing surface of the first rail; and
rotate in response to each of the first motors rotating a respective first drive roller;
a plurality of second drive assemblies housed within the platform, the plurality of second drive assemblies including:
a second drive roller configured to rest upon and frictionally engage the upward facing surface of the second rail; and
a second motor configured to rotate the second drive roller to propel the platform in the longitudinal direction; and
a plurality of second support assemblies, separate from the plurality of second drive assemblies, disposed within the platform and configured to support the platform along the first rail in the longitudinal direction, the plurality of first support assemblies each having:
a plurality of second passive rollers configured to:
rest upon and frictionally engage the upward facing surface of the second rail; and
rotate in response to each of the second motors rotating a respective second drive roller.

13. The system of claim 12, wherein a clamp is disposed on an underside of the platform and configured to extend in the lateral direction beneath an upper portion of the first rail or the second rail.

14. The system of claim 12, wherein each first motor and each second motor are configured to receive power from a storage device positioned on or within the platform.

* * * * *